May 26, 1953  M. E. FRY  2,639,659
BROILER

Filed Sept. 13, 1951  2 Sheets-Sheet 1

INVENTOR.
MILLARD. E. FRY.
BY
Willits, Hardman & Fehr.
HIS ATTORNEYS.

May 26, 1953 M. E. FRY 2,639,659
BROILER
Filed Sept. 13, 1951 2 Sheets-Sheet 2

INVENTOR.
MILLARD E. FRY.
BY
Willits, Hardman & Fehr.
HIS ATTORNEYS.

UNITED STATES PATENT OFFICE 2,639,659

BROILER

Millard E. Fry, Dayton, Ohio, assignor to General Motors Corporation, Dayton, Ohio, a corporation of Delaware Application September 13, 1951, Serial No. 246,389

2 Claims. (Cl. 99—393)

This invention relates to a cooking device and particularly to a broiler for use in ovens of ranges.

An object of my invention is to provide an improved broiler of the type including a grid within a drip pan and a novel method of affording adjustability of the grid relative to the bottom of the pan.

Another object of my invention is to attain adjustability of a grid in a drip pan of a broiler without materially increasing the cost of manufacturing the broiler.

A further object of my invention is to eliminate the necessity of forming or locating a plurality of vertically spaced apart supports or tracks along walls of an oven for the mounting of a broiler unit at various distances away from a source of heat generated in the oven by adjusting the height of a grid in a drip pan of a broiler unit.

A still further object of my invention is to provide an elongated curved ended drip pan of a broiler unit with a set of three upper grid supports and a set of three lower grid supports and an elongated grid therefor having a straight end and a rounded end which grid ends cooperate with the curved ends of the pan and with the grid supports in such a manner that when the grid is placed in the pan in one position it will be supported on the upper set of supports and when rotated end to end and placed in the pan its ends will freely move past the upper set of supports and engage the lower set of supports to thereby vary the height of the grid relative to the bottom wall of the drip pan.

Further objects and advantages of the present invention will be apparent from the following description, reference being had to the accompanying drawings, wherein a preferred form of the present invention is clearly shown.

Figure 1:
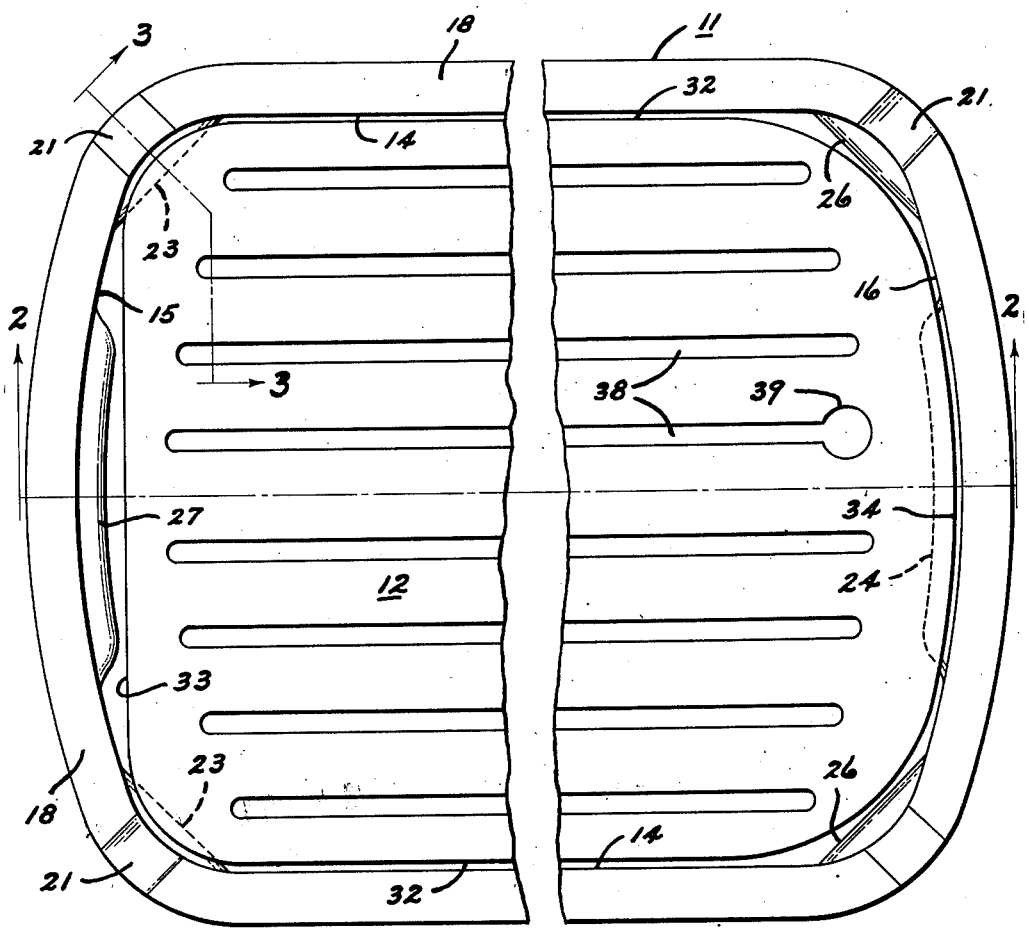
Fig. 1 is a broken top plan view of the broiler unit of my design showing a grid in the upper portion of a drip pan.

A broiler unit is usually employed in the oven of a range for broiling food under an open gas flame or by the directly radiated heat of an electric heating element. Such a broiler unit commonly includes a pan and an open type grid therein for supporting the food to be cooked. The pan is adapted to catch grease, juice, etc., which drips from meat or the like being broiled. At times fast broiling and intense browning may be required and the meat should therefore be located in close proximity to the source of heat in the oven. At other times relatively slow broiling and less browning of the meat may be required and the meat should then be located farther away from the source of heat in the oven. It is therefore desirable to provide a vertical adjustment for the grid, upon which the meat is supported in the broiler, relative to the bottom of the drip pan and to the source of heat to afford variations in the rate of broiling and the intensity of browning of meat being broiled.

In consideration of the foregoing I provide for adjusting the position of the food relative to the source of heat in an oven by altering the support of the grid in the drip pan from an upper location to a lower location independently of broiler mounting means within an oven. Referring now to the drawings I show in Fig. 1 thereof, a broiler unit or assembly comprising an elongated metal drip pan 11 and an elongated metal food supporting grid 12 therein. The pan 11 includes substantially straight upright side walls 14, upright curved end walls 15 and 16 and a bottom wall 17. The upper part of walls 14, 15 and 16 are bent outwardly as at 18 and thence downwardly as at 19 (see Fig. 2) to provide a depending flange adapted to rest on tracks within and extending along the side walls of an oven or broiling compartment of a cooking range. The flat outwardly bent portion 18 is provided with a depression 21 at each corner of pan 11 (see Figs. 1 and 3) and these depressions form pouring spouts for facilitating the running of grease or the like out of the pan. Means is provided to support the grid 12 in pan 11 at a plurality of different elevations relative to the bottom wall 17 of the pan. This means comprises a first or upper set of three grid supports in the form of or including a pair of bosses 23, each projecting inwardly of the upright walls of pan 11 at the corners of the curved end 15 thereof and a third boss or ledge 24 projecting inwardly from the central part of the curved upright end 16 of pan 11. The grid supporting means also comprises a second or lower set of three grid supports in the form of or including a pair of bosses 26 each projecting inwardly of the upright walls of pan 11 at the corner of the curved end 16 thereof and a third boss or ledge 27 projecting inwardly from the curved upright end 15 of pan 11. It will be noted that the bosses or grid supports 23 and 26 extend diagonally across the corners of the pan and the other third bosses or ledges 24 and 27 are elongated and curved to correspond to the curvature of the end walls 15 and 16 of pan 11. It should also be noted that, by virtue of curving the ends 15 and 16 of pan 11 as shown, the pairs of bosses or grid supports 23 and 26 are disposed nearer the center of pan 11 than the ledges 24 and 27 and that the supports of the upper and lower sets thereof are all located out of vertical alignment with one another.

Grid 12 is of a novel formation and has ends shaped to cooperate with the curved ends of drip pan 11, of the broiler unit, and with the sets of grid supports formed or embossed inwardly from the pan walls, in such a manner that when the grid is placed in pan 11, in one position, it is supported at three points on the upper set of grid supports and when the grid is rotated, end to end, and placed in pan 11 it is supported at three points upon the lower set of grid supports. This grid is in the form of a metal plate-like member having substantially straight sides 32, a substantially straight end 33 and a rounded end 34.

The rounded end 34 of the grid 12 is in the form of a lip having at least the central part thereof extending outwardly beyond the main body portion of the grid. A depending flange 36 (see Figs. 2 and 3) extends continuously around the periphery of grid member 12 to strengthen the same and to provide a rim to be supported upon the grid supports hereinbefore described. The main body portion of grid 12 inwardly of its periphery is corrugated as at 37 (see Fig. 3) and provided with a plurality of elongated openings 38 at the bottom of the undulations of the corrugations so as to permit greases, juices, etc., to flow from meat or other food supported on the grid into the drip pan 11. One or more of the openings 38 in grid 12 may have an enlarged portion such as is shown at 39 (see Fig. 1) serving to receive a person's finger or thumb to facilitate raising of the grid 12 relative to pan 11 and removal thereof from the pan.

Figure 2:
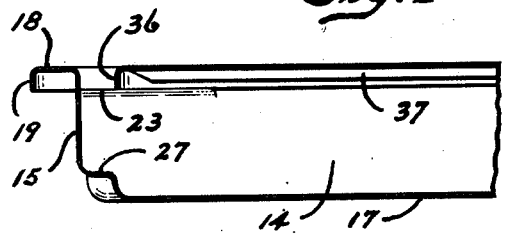
Fig. 2 is a transverse broken vertical sectional view taken on the line 2—2 of Fig. 1 showing the support of the grid on the pan.
Figure 2:
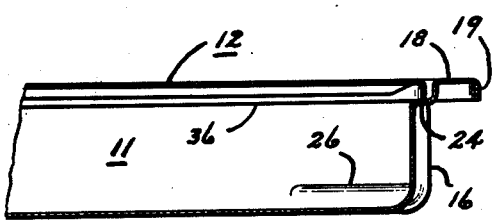
Figure 3:
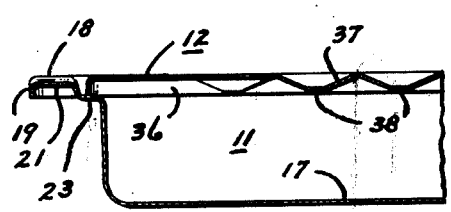
Fig. 3 is a fragmentary vertical sectional view taken on the line 3—3 of Fig. 1 showing a pouring spout at a corner of the drip pan and corrugations formed in the grid.
Figure 4:
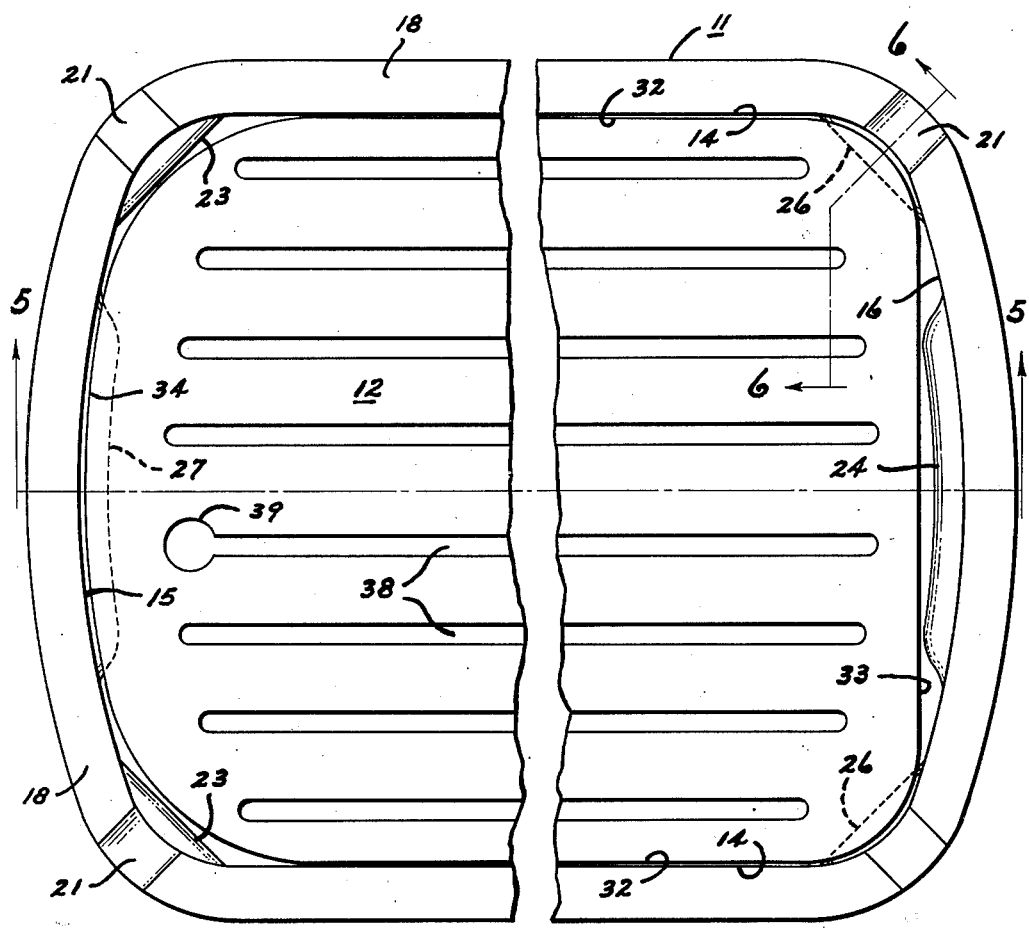
Fig. 4 is a broken top plan view similar to Fig. 1 of the broiler unit and shows the grid in the lower portion of the drip pan.
Figure 5:
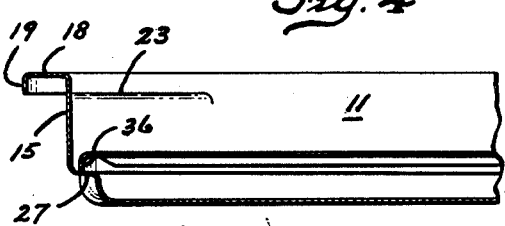
Fig. 5 is a transverse broken vertical sectional view taken on the line 5—5 of Fig. 4 showing the support of the grid in the pan.
Figure 6:
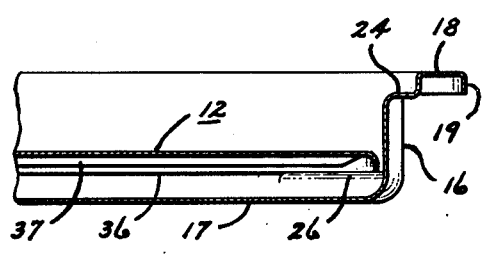
Fig. 6 is a fragmentary vertical sectional view taken on the line 6—6 of Fig. 4 showing a pouring spout at another corner of the grid.

When it is desired to locate meat or the like, to be broiled, in close proximity to the source of heat within an oven of a range, the grid 12 is placed in pan 11 and supported upon the three upper grid supports 23 and 24 as shown in Figs. 1, 2 and 3 of the drawings so that the grid occupies the upper portion of pan 11 near the top thereof. When it is desired to more slowly broil meat or the like and obtain less or slower browning thereof the grid 12 may be reversed longitudinally, by rotating or turning it end to end, relative to the drip pan 11 and lowered into the pan. By curving the end walls 15 and 16 of drip pan 11 and providing the ledges 24 and 27 of each set of grid supports along these curved end walls and also by providing the grid 12 with the straight cornered end 33 and the lipped or rounded end 34, as herein disclosed, the substantially straight end 33 of grid 12, when lowered into pan 11 in its rotated or reversed position, will clear and freely move past the ledge 24 of the upper set of three grid supports and the sides of the rounded end 34 of the grid will clear and freely move past the corner bosses 23 of the upper set of three grid supports. The corners at the straight end 33 and the central or outwardly projecting lip part of the rounded end of grid 12 will then engage the pair of bosses 26 and the ledge 27 respectively of the lower set of grid supports to position the grid in the lower portion of pan 11 as shown in Figs. 4, 5 and 6 of the drawings. This means of varying the height of grid 12 in drip pan 11 positions meat or the like supported on the grid closer to or farther away from the source of heat in an oven without changing the elevation of the drip pan within an oven and thereby eliminates the necessity of providing a plurality of vertically spaced broiler supports in and along the sides of an oven.

From the foregoing it should be apparent that I have provided an improved broiler unit or assembly wherein its grid may be adjusted along the height of the drip pan thereof in a unique manner and at three points of support at each adjusted position thereof. The improved structure permits the grid to occupy substantially all the area within the drip pan and prevents portions of meat located on the grid from dropping into the pan to thereby insure support of all portions of the meat on the same level with respect to the source of heat whereby uniform cooking of the entire cut of meat may be had.

While the form of embodiment of the invention as herein disclosed constitutes a preferred form, it is to be understood that other forms might be adopted, as may come within the scope of the claims which follow.

What is claimed is as follows:

1. For use in an oven, a cooking device including an elongated drip pan having upright side and end walls and a bottom wall, the side walls of said pan being relatively straight and the end walls thereof being curved, said pan being adapted to be removably mounted in the oven adjacent a source of heat therein, an elongated grid for supporting food to be cooked above the bottom wall of said drip pan, said grid being of a size to pass freely into said pan between the upright walls thereof, means for varying the height of said grid in said pan relative to said bottom wall thereof, said means comprising a first set of three grid supports near the top of said pan, said first set of three grid supports including a pair of bosses each projecting inwardly from a corner of one curved end of said pan and a ledge projecting inwardly from the central part of the other curved end of said pan, said means also comprising a second set of three grid supports below said first set thereof, said second set of three grid supports including a pair of bosses each projecting inwardly from a corner of said other curved end of said pan and a ledge projecting inwardly from the central part of said one curved end of said pan, said grid having a substantially straight end and a rounded end whereby when the same is lowered in one position toward the bottom of the pan the corners of its straight end rest on said bosses of said first set of grid supports and the central part of its rounded end rests on the ledge of said first set of grid supports to occupy the upper portion of said drip pan, and whereby when said grid is rotated end to end and lowered toward the bottom of the pan its straight end clears the ledge of said first set of grid supports with the corners thereof engaging the bosses of said second set of grid supports and its rounded end clears the bosses of said first set of grid supports with its central part engaging the ledge of said second set of grid supports to occupy the lower portion of said drip pan.

2. For use in an oven, a cooking device including an elongated drip pan having upright side and end walls and a bottom wall, said pan being adapted to be removably mounted in the oven adjacent a source of heat therein, an elongated grid for supporting food to be cooked above the bottom wall of said drip pan, said grid being of a size to pass freely into said pan between the upright walls thereof, means for varying the height of said grid in said pan relative to said bottom wall thereof, said means comprising a first set of three grid supports near the top of said pan, said first set of three grid supports including a pair of bosses each projecting inwardly from a corner of one end of said pan and a third boss projecting inwardly from the central part of the other end of said pan, said means also comprising a second set of three grid supports below said first set thereof, said second set of three grid supports including a pair of bosses each projecting inwardly from a corner of said other end of said pan and a third boss projecting inwardly from the central part of said one end of said pan, said grid having one end provided with corners and the other end provided with a central lip projecting outwardly from the main body portion thereof whereby when the grid is lowered in one position toward the bottom of said pan its said lip rests on the said third boss of said first set of grid supports and its corners at said other end thereof rests on said pair of bosses of said first set of grid supports so as to cause the grid to occupy the upper portion of said drip pan, and whereby when said grid is rotated end to end and lowered toward the bottom of the pan its said one end clears the said third boss of said first set of grid supports with the corners of said one end of the grid engaging said pair of bosses of said second set of grid supports and its said lip engaging the said third boss of said second set of grid supports so as to cause the grid to occupy the lower portion of said drip pan.

MILLARD E. FRY.

References Cited in the file of this patent

UNITED STATES PATENTS

| Number | Name | Date |
| --- | --- | --- |
| 2,321,676 | Hennessey | June 15, 1943 |
| 2,393,420 | Scheuplein | Jan. 22, 1946 |
| 2,459,657 | Klein | Jan. 18, 1949 |
| 2,477,721 | Chesser et al. | Aug. 2, 1949 |